INVENTORS:
PETER J. CLARKE,
NICHOLAS ROMAN,

BY *James J. Lichiello*
THEIR ATTORNEY.

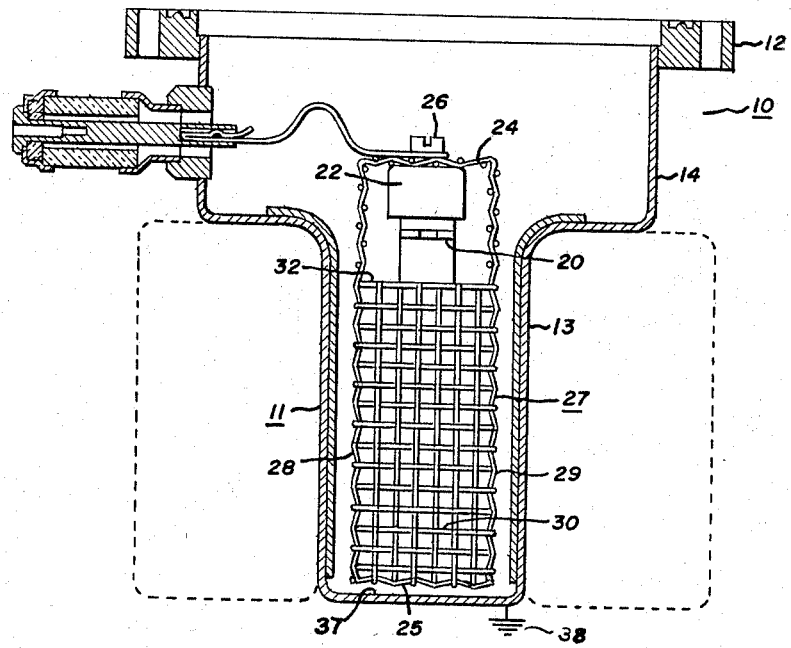
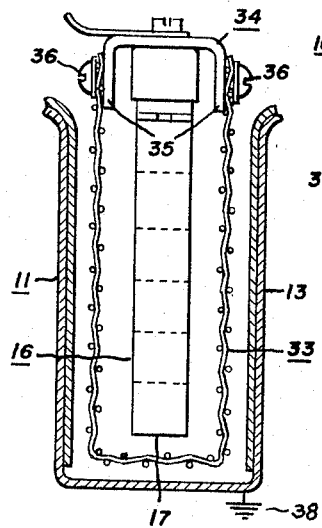
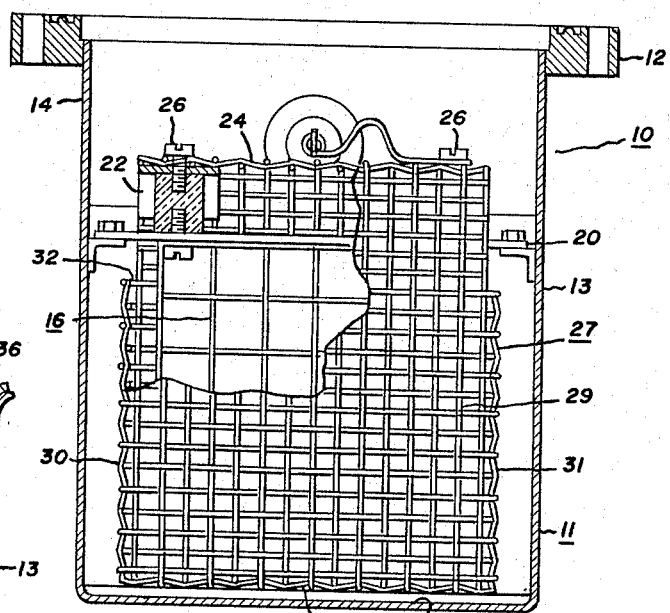

United States Patent Office 3,325,086
Patented June 13, 1967

3,325,086
TRIODE IONIC VACUUM PUMP
Peter Joseph Clarke, Stony Brook, and Nicholas Roman, Ballston Lake, N.Y., assignors to General Electric Company, a corporation of New York
Filed Sept. 20, 1965, Ser. No. 488,543
18 Claims. (Cl. 230—69)

This invention relates to a triode ionic vacuum pump and more particularly to an improved triode ionic vacuum pump utilizing a surrounding configuration sputter cathode.

A triode ionic vacuum pump is disclosed in U.S. Patent 3,080,104 Vanderslice, assigned to the same assignee as the present invention. Improvements and modifications of the aforementioned triode ionic pump are disclosed in copending applications Ser. No. 335,310 Kearns et al., filed Jan. 2, 1964, now Patent No. 3,228,590 and Ser. No. 316,694 Kearns, filed Oct. 16, 1963, now Patent No. 3,228,589, each of which is assigned to the same assignee as the present invention.

Briefly described, a triode ionic vacuum pump comprises a pair of parallel spaced apart oppositely positioned ion transparent sputter cathodes of multicellular or honeycomb design and usually made of a good gas gettering material as titanium. Positioned concentrically therebetween is a multicellular or honeycomb anode. The described electrodes are enclosed within a suitable chamber or housing which includes a pair of opposed planer faces or surfaces adjacent and parallel to each of the sputter cathodes and serving as collector electrodes. A magnetic field is established by means of a permanent magnet for example adjacent the described planar faces to provide a magnetic field passing axially through the multicellular anodes. An electrical glow discharge between the mentioned electrodes provides electrons moving in elongated paths and colliding with gas molecules to generate positive gas ions. These ions are attracted to the sputter cathodes and are imbedded therein or sputter fresh cathode getter material on the interior of the pump to entrap or getter gas ions.

Triode ionic pumps as well as other ionic pumps display a gradual loss of pumping efficiency at lower operating pressures in the system being evacuated. At the same time triode ionic pumps as well as other ionic pumps are difficult to restart at lower pressures, one reason being because of a marked tendency of arcing particularly between the sputter electrode and the housing or collector electrodes. This arcing usually occurs along the edge surfaces of the electrodes and between the electrodes and the housing at the lowest end or edge surface of the anode and sputter cathode electrodes. Arcing may occur at low pressures, and also at higher pressures of greater than about $5 \times 10^{-5}$ torr. Arcing in the areas as noted contributes to a rapid rise in temperature and consequent strain or buckling in the electrode structure. Further arcing deleteriously erodes the structure, provides localized release of gases from overheated parts, and, combined with reduced sputtering, is very detrimental to effective ion pumping. It has been discovered that by inserting additional active portions of sputter cathode material in the edge clearance between the sputter cathode electrodes and the housing, considerable control could be exercised over arcing and hard starting conditions.

Accordingly, it is an object of this invention to provide an ionic pump of reduced arcing tendencies and improved starting characteristics.

It is a further object of this invention to provide a surrounding sputter cathode structure for a triode ionic pump.

It is yet another object of this invention to provide a wraparound sputter cathode for a triode ionic pump.

It is another object of this invention to provide a one piece wraparound multicellular sputter cathode structure for a triode ionic pump.

It is a still further object of this invention to provide a one piece wraparound wire mesh sputter cathode structure for a triode ionic pump.

It is a still further object of this invention to provide a titanium wire mesh cage structure as the sputter cathode for a triode ionic pump.

Briefly described, this invention in one of its preferred forms includes an ionic pump having an ion transparent multicellular anode structure of planar design. Surrounding the anode structure is a mesh type or multicellular sputter cathode which generally encloses the anode structure on at least the larger front and back surfaces of the planar design and one other edge surface, preferably the lower edge. For a specific example, a rectangular multicellular anode structure is positioned within an enclosure cage of a honeycomb or wire mesh material so as to be surrounded on all side and edge surfaces with active sputter cathode areas.

This invention will be better understood when taken in connection with the following description and the drawings in which FIG. 1 is an illustration of a preferred form of this invention;

FIG. 3 is an illustration of yet another modification of this invention;

FIG. 4 is a side elevation view of the embodiment of FIG. 3;

FIG. 5 is an illustration of the further modification of this invention.

Figure 1:
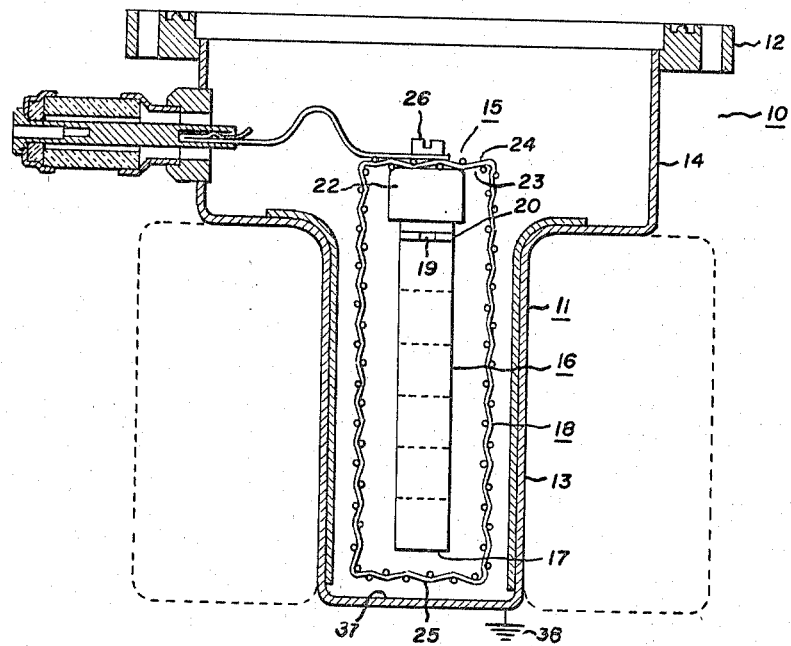
Figure 2:
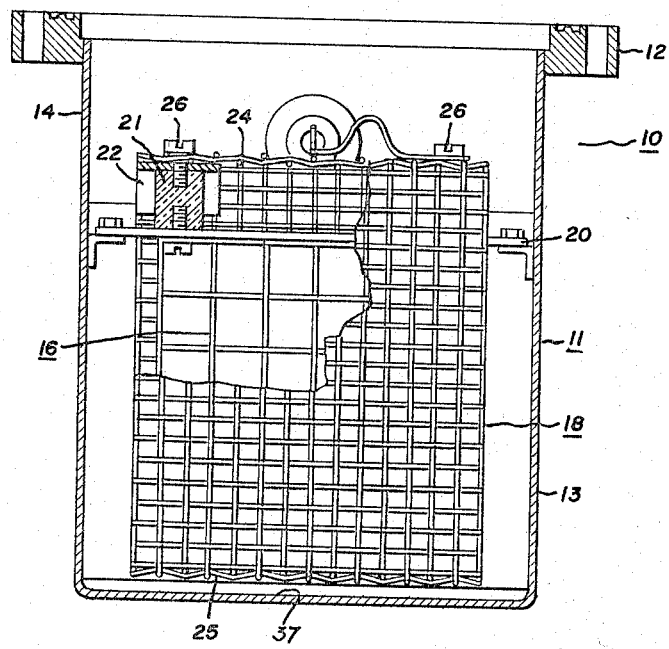
FIG. 2 is a side elevation view of the embodiment of FIG. 1.

Referring now to FIG. 1, there is illustrated an ionic pump assembly 10 utilizing the teachings of this invention. In FIG. 1, pump assembly 10 includes the chamber or housing 11 which is fitted with a circular opening defining a flange 12 for joining the housing to an apparatus to be evacuated. Housing unit 11 includes a lower general rectangular volume section 13 and an upper transitional volume section 14 extending well below flange 12 to have a substantial depth. A unitary electrode structure 15 is included in the housing 11 within the rectangular section 13 thereof. While the housing 11 may include various modifications of materials and structures, in an improved version of this invention housing 11 is produced from, for example, stainless steel. The rectangular section is adapted to have opposite pole pieces of a magnet adjacent each larger side to provide a magnetic field extending transversely through the larger side surfaces of housing 11.

Electrode structure 15 in one preferred embodiment of this invention is the unitary type of structure which is disclosed in copending application Ser. No. 316,694 Kearns, filed Oct. 16, 1963, and assigned to the same assignee as the present invention. More particularly, electrode structure 15 includes a central planar and rectangular anode 16 of an open, foraminate, or gridlike structure of substantial electron or ion transparency. Anode structure 16 may comprise a single ring or cylinder cell such as disclosed in U.S. Patent 2,755,014 Westendorp or a plurality of such cells. In the embodiment as illustrated in FIG. 1 the individual cells are defined by a plurality of interfitting slats providing gridlike cells of substantial axial depth.

An important feature of this invention is surrounding or enclosing the anode with an electron transparent sputter or collector cathode 18. The sputter cathode 18 may be U-shaped to enclose at least one of the four edges or end surfaces of the anode, preferably the lowermost edge, or may be in the form of a cage or enclosure to enclose a number of or all end surfaces. In a preferred embodiment of the invention at least the lower end surface 17 of anode 16 is enclosed by the sputter cathode 18 or includes an active portion of the sputter cathode between end surface 17 and casing 11. This portion extends transversely toward the anode so that its surface extends generally in the same direction as the magnetic field, and at least should pass under anode 16. In a preferred embodiment, this transverse portion becomes the tang of a U whose opposed sides are sputter cathodes.

While the sputter cathode 18 may be of a grid or honeycomb configuration such as disclosed in the mentioned copending applications, a preferred embodiment is a sputter cathode 18 in the form of a wire grid or woven mesh. The grid or mesh of sputter cathode 18 should be of a good reactive or sputter material, examples being titanium, zirconium, tungsten and other getter metals and materials, a preferred material being titanium. In one example of this invention the titanium wire was 60 mil diameter of #4 mesh. Such a mesh having rectangular side walls of about 3.75 in. x 9.5 in. and opposed end walls of about 1.25 in. width was employed with good results in a 25 liter per second ion pump as disclosed in the mentioned Kearns application 335,310.

An active portion of the sputter cathode is a portion similar in function as the remainder of the sputter cathode, i.e., it is of a reactive material, is ion transparent, will adsorb gases, and will sputter getter material when struck by positive ions. In its defined position of being generally parallel to the magnetic field the individual openings in the defined plane of the portion are transverse to the openings of the remainder of the cathode and also those of the anode. The operative area of the additional sputter cathode portion is a minor area and minor pumping occurs as compared to the major pumping areas defined by the opposed cathode-anode-cathode surfaces.

A number of advantages are attained by the use of a wire mesh for sputter cathode 18. A preferred material such as titanium is commercially available in a number of mesh sizes. This material is of good structural integrity, and is easily worked and cut to a variety of bent shapes and other configurations. More importantly, however, meshes provide an increased surface area of circular configurations contributing to the desirable feature of having ions strike the sputter cathode at oblique angles of incidence.

In FIG. 1 sputter cathode mesh structure 18 is in the form of a closed four-sided rectangular loop preferably of lateral dimensions similar to the lateral dimensions of anode 16. Sputter cathode loop 18 is supported from the anode by means of support assemblies 19. As illustrated in FIG. 1, anode 16 is connected to a support bar 20 which spans the casing 11 and is secured thereto. A pair of electrically insulating cylinders 21 are positioned in spaced relationship along the bar. Each cylinder 21 also includes a metal cup-shaped sputter shield 22 which is fitted over the upper end of each cylinder. The inner surface 23 of the upper end panel 24 of the four-sided loop cathode 18 rests upon the sputter shields so that the cathode is supported in depending relationship. Suitable screw means 26 are inserted through the mesh cathode and through suitable aligned openings in the sputter shields and insulating cylinders to threadedly engage threaded apertures in support bar 20. The foregoing represents one exemplary arrangement for supporting a loop cathode 18 so that at least one transverse portion or end panel 25 extends under anode 16, specifically about or transversely along the periphery thereof and preferably interconnects the two sides 30 and 31. The end panel 25 is described as an operative portion of the sputter cathode, i.e., of the same material and preferably of the same structural configuration. The upper panel 24, however, is primarily an expedient for attaching and supporting the sputter cathode structure. The fully active portion 25 must extend adjacent an end wall of the housing between the housing and the cathode. Preferably the end wall is that portion or wall which is opposite to the supporting means for the electrode structure. The plane of the anode and the transverse sputter cathode portion intersect if extended spatially, but do not physically intersect.

Sputter cathode 18 may also take the form of a closed or substantially closed cage like structure 27 as illustrated in FIGS. 3 and 4. Referring to FIGS. 3 and 4, sputter cathode 27 is formed of titanium mesh to enclose anode 16 on all sides and edge surfaces, i.e., a generally rectangular sputter cathode structure of six sides, 24, 25, 28, 29, 30 and 31. Such a configuration, in addition to providing active sputter cathode portions between the corresponding end surfaces of the anode 16 and housing 11, also provides an increase in sputter cathode area and material. Furthermore, the smaller vertical end panels 28 and 29 of sputter cathode 27 increase the rigidity of the sputter cathode structure with respect to bending or warpage forces in operation of the pump.

For ease of assembly the cage structure 27 has removed portions of the end panels defining openings 32. The openings 32 include a lateral dimension which in one form is generally equal to the lateral dimension of the vertical end panels 28 and 29. At the same time the openings 32 extend vertically from the upper panel surface 24 of structure 27 to a short distance below support bar 20.

The cage 27 may be made up from a number of panels which are suitably welded or otherwise joined, or may be a bent or pattern shape to include a number of sides. At the same time the anode structure may be inserted in the cage structure 27 by a number of different well known methods. In FIG. 3 the anode is inserted into the cage 27 with the top panel 24 in a vertical position, and thereafter the top panel 24 is bent over and welded to the mating side panel. Also, the top panel 24 may be in the form of a pair of narrow panels which are bent over and held in place by screws 26.

A further preferred embodiment of this invention is illustrated in FIG. 5. Referring to FIG. 5, a sputter cathode 33 is in the form of a five-sided or open box like enclosure. Sputter cathode enclosure 33 may be supported from support bar 20 in the same manner as the sputter cathodes are supported in the mentioned copending Kearns applications. For example, and as illustrated in FIG. 5 a pair of U-shaped brackets 34 (one shown) are attached to insulators 21 by means of screws 26 so that the arms 35 of the brackets 34 depend downwardly at the sides of the anode 16. The enclosure is attached directly to the arms by means of screws 36. Alternatively, enclosure 33 may be provided with and attached to a peripheral frame member which is then attached to arms of brackets 33 by screw members 36.

Where the sputter cathode member is in its simplest form, a three-sided or U-shaped member, the side panels which are the arms of the U-shaped cathode member may also be directly or indirectly attached to the bracket support member as described for FIG. 4. Alternatively, suitable bracket like arm members may be formed from the sputter cathode mesh for attachment by screws 36.

Better starting and operating characteristics are obtained by the use of mesh type sputter cathodes, when an active part of the sputter cathode surface is positioned along an edge or peripheral surface of an anode, such as end panel 25 in the figures. Preferably, the active part of the mesh surface, which is an additional transverse part, is parallel to the periphery of the anode edge surface and parallel to the magnetic field. The additional sputter cathode surface aids in distributing the charge potential along adjacent surfaces and thereby lessens arcing tendencies. Since the discharge is distributed over a wide area, local heating is minimized and titanium which is sputtered from the mesh remains sufficiently cool to act as an effective getter.

Observation of the action occurring between end panel 25 and the adjacent opposed surface 37 of the housing 11 indicates that there is a linear magnetron discharge therebetween. The electrode potential available and the shape and direction of the crossed electric and magnetic fields between surfaces 24 and 37 are within the known requirements for magnetron discharge. The spacing between the end panel 25 and adjacent housing surface 37 is retained at less than about 0.5 inch and preferably about 0.125 inch. Calculation of electron orbit in this area indicates that the electron orbit for the magnetron effect is less than 0.125 inch.

The action of the additional transverse portion 25 of the sputter cathode 18 is in accordance with the well known Paschen's law which states that for a given distance between electrodes in a gas, there is a critical pressure at which discharge occurs at the minimum breakdown potential of the gas. In the instant invention the position and spacing of the magnetron effective parts are predetermined to provide this effect between surfaces 25 and 37. There is thus provided a combination of the glow discharge type of ion pump and the magnetron discharge type of ion pump where one is complementary to the other. The proportions of the pump of this invention may be changed to provide an increased and more significant effect from the magnetron portion. Most of the easier starting characteristics and lower pressure pumping of this improved pump are believed to be derived from the magnetron effect or other electrical effects between surfaces 25 and 37.

The end surfaces of the anode which are parallel and spaced opposite from sputter cathode surfaces such as 30 and 31 may also be provided with suitable openings for electron transparency, if desired, for an increase in edge effects.

The electrical connection for the structure disclosed may take a number of forms. For example, the relationship should generally be that the sputter cathodes are maintained at a negative potential with respect to the anode electrode, and the housing or collector electrode is maintained at a positive potential with respect to the sputter cathode. One preferred arrangement includes connecting the anode 16 and housing to ground potential as illustrated by ground connection 38, FIG. 1, and the sputter cathode 18 to a high negative potential. A further arrangement includes connecting the anode 16 to a source of high positive potential, the sputter cathode 18 to a source of negative potential, and the collector housing 11 to a source of higher negative potential. With either of the foregoing and other forms of electrical connections, advantages are attained by the use of the described forms of sputter cathodes of this invention.

An included and exemplary operation of the described ionic pump relates to the establishment of a glow discharge between the anode and sputter cathode in accordance with the aforementioned preferred electrical connection. Electrons present and available from numerous sources in the pump housing, which is connected to a chamber to be evacuated, are accelerated to the anode structure which is described as at positive potential with respect to the sputter electrode. Because of the presence and transverse direction of the magnetic field with respect to the anode and sputter cathode, these electrons are caused to describe extended orbit like trajectories on their path toward the anode. These extended trajectories increase the likelihood of electron collisions with gas molecules in housing 11. These collisions generate gas ions of generally positive charge which are accelerated at high velocity toward the sputter cathode. These ions upon striking the sputter cathode do so at oblique angles of incidence not only because of their trajectories, but also because of the rounded wire mesh surfaces. The described striking causes sputtering of the reactive, getter metal, titanium for example, from the sputter cathode. The sputtered metal is collected on the internal surfaces of the housing particularly, providing fresh gettering surfaces for absorbing and entrapping gas molecules. It should also be mentioned that electrons may and do pass through the anode without striking its surface and may in fact oscillate therethrough. In this connections ions may pass through the sputter cathode without striking its surfaces, and because of the less negative potential of the housing will revert and strike the sputter cathode from the opposite side.

The use of the cage or enclosing sputter cathode provides more operative sputter cathode material and surface area where collector surface is available and additional pumping is attained. It has also been found that the mesh type sputter cathode is more economical both from the standpoint of material cost and also fabrication costs.

Preferred operative combinations include mesh sizes of about #2 through #8 utilized in conjunction with anodes which although gridded may be described as #2 mesh, i.e., two openings per inch. A preferred sputter cathode is a #4 mesh for a #2 anode mesh. One of the openings of the sputter cathode should be in concentric alignment with an opening in the anode so that a coaxial line through the anodes and cathodes follows a direct unobstructed opening.

While this invention has been described with reference to particular and exemplary embodiments thereof, it is to be understood that numerous changes can be made by those skilled in the art without actually departing from the invention as disclosed, and it is intended that the appended claims include all such equivalent variations as come within the true spirit and scope of the foregoing disclosure.

What is claimed and desired to be secured by Letters Patent of the United States is:

1. In an ion pump operative by establishing an electrical discharge between an electron transparent anode and a reactive cathode for sputtering of reactive material from said cathode to entrap gas molecules, the improvement comprising
  (a) an electron transparent cathode adjacent said anode to define first opposed and major operative portions of said anode and cathode to support a glow discharge therebetween;
  (b) an active electron transparent portion of said cathode extending transversely toward said anode in spatial intersecting relationship thereto and defining a minor operative portion of said anode and said cathode in transverse relationship to said first major operative portion.

2. The invention as recited in claim 1 wherein said sputter cathode is a wire mesh.

3. The invention as recited in claim 2 wherein said mesh is in the form of a loop like enclosure enclosing said anode.

4. The invention as recited in claim 2 wherein said mesh electrode is in the form of a cage substantially enclosing said anode.

5. A triode ionic pump comprising in combination,
  (a) a housing having spaced apart parallel walls;
  (b) an ion transparent planar anode electrode in said housing in parallel and intermediate and spaced parallel relationship with said parallel housing walls;
  (c) an ion transparent active getter material sputter cathode electrode in said housing in enclosing relationship to said anode electrode and spaced therefrom and from said housing walls;
  (d) said sputter electrode defining a cage enclosure enclosing said anode therein in spaced planar relation to the sides of said cage;
  (e) and means to provide a glow discharge between electrodes to cause sputtering of said sputter cathode material on the walls of said housing for gas entrapment.

6. The invention as recited in claim 5 wherein said sputter cathode is a reactive metal wire mesh.

7. The invention as recited in claim 5 wherein said sputter cathode is a titanium wire mesh in the mesh size range of #2 to #8 mesh.

8. A triode ionic vacuum pump comprising in combination
   (a) a housing member having close spaced side walls, narrow end walls, and opposed open and closed ends;
   (b) an electron transparent anode in said housing having a portion of which is planar in spaced parallel relationship with said side walls and transverse to a magnetic field extending through said side walls;
   (c) an electron transparent sputter cathode having a portion of which is in concentric and spaced planar arrangement to said anode;
   (d) means to cause a glow discharge between said concentric portions of said anode and cathode to cause sputtering of cathodic material on the housing of said pump for gas entrapment thereby;
   (e) an active portion of said sputter cathode extending transversely toward said anode at the periphery thereof and spaced therefrom.

9. A triode ionic pump comprising in combination
   (a) a housing having closely spaced apart parallel large side walls, and narrow end walls defining an opening therein;
   (b) a planar grid ion transparent anode positioned in spaced apart relationship between said walls;
   (c) a planar grid ion transparent sputter cathode positioned in said housing between and in spaced parallel relationship with said housing walls;
   (d) said sputter cathode including a planar parallel portion on each side of and spaced from said anode and said housing walls;
   (e) said sputter cathode including a planar parallel active portion transversely interconnecting said parallel portions about the periphery of said anode.

10. The invention as recited in claim 9 wherein said transverse portion extends laterally substantially completely about the periphery of said anode.

11. The invention as recited in claim 9 wherein said transverse portion extends at least along the periphery of said anode opposite the open end of said housing.

12. The invention as recited in claim 11 wherein said transverse portion extends along periphery of said anode an iddition to the said position opposite the said open end.

13. The invention as recited in claim 9 wherein said sputter cathode is formed of wire mesh.

14. A triode ionic pump comprising in combination
   (a) a pump housing having closely spaced large side walls and narrow end walls defining an open end;
   (b) an electrode assembly positioned in said housing;
   (c) said electrode assembly comprising an electron transparent planar grid anode intermediate a pair of parallel planar spaced gas getter material wire mesh cathodes;
   (d) said electrode assembly positioned in said housing in spaced parallel relationship to said side walls;
   (e) means to provide an electrical glow discharge between said anode and cathode to cause sputtering of cathodic material on said housing walls for gas entrapment thereby;
   (f) means to provide a magnetic field adjacent said side walls having lines of force extending therethrough and through the defined openings in said electrodes;
   (g) means supporting said assembly from adjacent the open end of said housing so that said assembly depends into said housing with defined peripheries spaced from said end walls;
   (h) a portion of one of said wire mesh sputter cathodes extending transversely between and interconnecting said parallel spaced wire mesh cathodes;
   (i) said portion being in spaced parallel relationship with said end wall at a point opposite said open end and in spaced parallel relationship to the periphery of said anode at a point between the periphery of said anode and said end walls.

15. The invention as recited in claim 14 wherein said electrodes and housing are of complementary rectangular shape.

16. An ionic pump comprising in combination
   (a) a pump housing member;
   (b) an electron transparent anode in said housing;
   (c) an electron transparent sputter cathode in said housing;
   (d) electrical connection means to provide a glow discharge between said anode and said cathode to cause sputtering of sputter cathode material in said pump housing for gas entrapment thereby;
   (e) magnetic means adjacent said housing to establish a magnetic field having lines of force passing transversely through said electrodes;
   (f) additional electron transparent sputter cathode means positioned in said housing in cooperative relationship to said electrodes, said magnetic means and said housing to provide a linear magnetron action therebetween for ionic pumping action.

17. The combination of a glow discharge and magnetron ion vacuum pump comprising in combination
   (a) a housing member;
   (b) a pair of spaced electron transparent electrode members in said housing;
   (c) means to provide a glow discharge between said electrodes to cause sputtering of a reactive getter material in said housing for gas entrapment;
   (d) magnetic means adjacent said electrodes to provide a magnetic field having lines of force extending transversely through said electrodes;
   (e) additional electrode means in said housing adjacent said electrodes and said magnetic means in an area traversed by crossed electric and magnetic fields;
   (f) said additional electrode means causing a magnetron discharge in said housing for generation of positive gas ions.

18. A triode ionic pump comprising in combination
   (a) a pump housing having closely spaced large side walls and narrow end walls defining an open end;
   (b) an electrode assembly positioned in said housing;
   (c) said electrode assembly comprising an intermediate electron transparent grid anode in planar form;
   (d) an electron transparent woven mesh sputter cathode in planar form positioned one on each opposite side of said anode;
   (e) said cathodes being spaced from said anode and said side sidewalls and in parallel relation thereto;
   (f) said electrode assembly positioned in said housing in spaced parallel relationship to said side walls;
   (g) means to provide an electrical glow discharge between said anode and cathode to cause sputtering of cathodic material on said housing walls for gas entrapment thereby;
   (h) means to provide a magnetic field adjacent said side walls having lines of force extending therethrough and through the defined openings in said electrodes, and
   (i) means supporting said assembly from adjacent the open end of said housing so that said assembly depends into said housing with defined peripheries spaced from said end walls.

References Cited

UNITED STATES PATENTS

| | | | |
|---|---|---|---|
| 2,993,638 | 7/1961 | Hall et al. | 230—69 |
| 3,141,986 | 7/1964 | Lloyd et al. | 313—7 |
| 3,231,175 | 1/1966 | Zaphiropoulos | 230—69 |

ROGERT M. WALKER, *Primary Examiner.*